(12) United States Patent
Kim

(10) Patent No.: US 7,474,637 B2
(45) Date of Patent: Jan. 6, 2009

(54) SIGNAL SUPPLY APPARATUS AND METHOD FOR PUBLIC AND PRIVATE MOBILE COMMUNICATION SYSTEM

(75) Inventor: Ki-Wook Kim, Suwon-shi (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1169 days.

(21) Appl. No.: 10/253,656

(22) Filed: Sep. 25, 2002

(65) Prior Publication Data

US 2003/0058814 A1 Mar. 27, 2003

(30) Foreign Application Priority Data

Sep. 27, 2001 (KR) ................. 2001-59972

(51) Int. Cl.
*H04B 2/212* (2006.01)
(52) U.S. Cl. .................. 370/324; 370/328; 370/350; 370/503; 375/355; 375/356; 375/357; 455/502; 455/561
(58) Field of Classification Search ............. 370/324, 370/507, 510; 375/359
See application file for complete search history.

(56) References Cited

U.S. PATENT DOCUMENTS

| | | | |
|---|---|---|---|
| 5,291,511 A * | 3/1994 | Maher et al. ............. | 370/428 |
| 5,577,071 A * | 11/1996 | Gehrke et al. ............ | 375/259 |
| 6,304,582 B1 * | 10/2001 | Zhang et al. ............. | 370/503 |
| 6,542,754 B1 * | 4/2003 | Sayers et al. ............ | 455/502 |

(Continued)

FOREIGN PATENT DOCUMENTS

JP 08-265838 11/1996

(Continued)

OTHER PUBLICATIONS

Bur Goode, "*Voice Over Internet Protocol (VoIP)*", IEEE, vol. 90, No. 9, pp. 1495-1517, Sep. 2002.

(Continued)

*Primary Examiner*—Chi H. Pham
*Assistant Examiner*—Shick Hom
(74) *Attorney, Agent, or Firm*—Robert E. Bushnell, Esq.

(57) ABSTRACT

A signal supply apparatus for a public and private mobile communication system. The apparatus has Internet protocol base transceiver subsystems, and a private base station controller that controls the Internet protocol base transceiver subsystems. Instead of having a global positioning system receiver (GPSR) in each of the Internet protocol base transceiver subsystems to receive time of day (TOD) signals, the TOD signals are relayed to each of the Internet protocol base transceiver subsystems via a LAN cable. It is only the base station controllers that have the GPSR that receives the TOD signals. Then, these TOD signals are relayed from the base station controller to respective collective base station transceivers and then from each collective base station transceiver to their respective Internet protocol base transceiver subsystems via a LAN cable.

21 Claims, 5 Drawing Sheets

U.S. PATENT DOCUMENTS

| | | | |
|---|---|---|---|
| 2001/0012791 A1* | 8/2001 | Miyake et al. | 455/566 |
| 2001/0016498 A1* | 8/2001 | Kang et al. | 455/453 |
| 2001/0024455 A1* | 9/2001 | Thaler et al. | 370/503 |
| 2001/0041594 A1* | 11/2001 | Arazi et al. | 455/561 |
| 2001/0046215 A1 | 11/2001 | Kim | 370/329 |
| 2002/0072381 A1 | 6/2002 | Becker et al. | 455/502 |
| 2003/0012158 A1* | 1/2003 | Jin et al. | 370/335 |
| 2003/0058742 A1* | 3/2003 | Pikula et al. | 368/47 |

FOREIGN PATENT DOCUMENTS

| | | |
|---|---|---|
| JP | 11-145900 | 5/1999 |
| JP | 2000-023245 | 1/2000 |
| JP | 2000-514984 | 11/2000 |
| JP | 2001-197547 | 7/2001 |
| JP | 2003-509973 | 3/2003 |

OTHER PUBLICATIONS

Chinese Office Action of the Chinese Patent Application No. 02143080.2, issued on Dec. 10, 2004 (English translation attached).

Japanese Office Action is applicant's corresponding Japanese Patent Application No. 2002-282386, issued Jul. 14, 2005.

Gibson, "The Mobile Communications Handbook", CRC Press, Inc., 1996, pp. 265-266.

Glossary for "binding information, BS, BSS, BTS", User Guide for Cisco Home Agent Service manager, Cisco, pp. GL-17.

Gibson, "The Mobile Communications Handbook", CRC Press, Inc., 1996, pp. 265-266.

* cited by examiner

SIGNAL SUPPLY APPARATUS AND METHOD FOR PUBLIC AND PRIVATE MOBILE COMMUNICATION SYSTEM

CLAIM OF PRIORITY

This application makes reference to, incorporates the same herein, and claims all benefits accruing under 35 U.S.C. § 119 from my application entitled SIGNAL SUPPLY APPARATUS FOR PUBLIC AND PRIVATE MOBILE COMMUNICATION SYSTEM filed with the Korean Industrial Property Office on 27 Sep. 2001 and there duly assigned Serial No. 2001-59972.

BACKGROUND OF THE INVENTION

1. Field of the Invention

The present invention relates to a mobile communication system, and more particularly to a signal supply apparatus in a system that can provide both public and private mobile communication services.

2. Description of the Prior Art

In a general mobile communication system, a base station controller (BSC) receives a reference clock signal from a satellite, and synchronizes its internal equipment. For instance, the BSC provides a link between the BSC and a mobile switching center (MSC), a link between the BSC and a base transceiver subsystem (BTS), and a vocoder. In order to receive the reference clock from the satellite, a global positioning system receiver (GPSR) is mounted in the respective BSCs and BTSs, respectively. The GPSR receives GPS information that includes the reference clock and time of day (TOD) information from the satellite, and provides the GPS information to the corresponding equipment.

As described above, in order to receive the reference clock, the GPSR should be mounted on the respective BSCs and BTSs. However, if it is possible to supply the GPS information including at least the reference clock to the respective BTSs that belong to the BSC in a state that the GPSR is mounted only in the corresponding BSC, the system cost can be reduced. Also, if it is possible to supply the GPS information including at least the reference clock to the BSC and BTS using the existing lines, the cost of system installation can be reduced.

U.S. Patent Application Publication No. 2001/0046215 to Kim pertains to a public/private mobile telephone system where only pBSC 203 has a GPS receiver. However, Kim '215 does not teach relaying the date and time information received by the GPS receiver over a LAN cable to a large plurality of Internet protocol private base transceiver subsystems to run a clock in these Internet protocol private base transceiver subsystems, thereby avoiding the need of many GPS receivers.

U.S. Patent Application Publication No. 2001/0024455 to Thaler et al. teaches distributing a reference time signal throughout a IEEE 1394 network. Thaler '455 contemplate receiving the reference signal from GPS. Non 1394 networks are also contemplated. Thaler '455 teaches that the network may be wired or wireless. An 8 kHz clock is contemplated in FIG. 4. Thaler '455 also teaches distribution of the time reference signal over a LAN.

U.S. Patent Application Publication No. 2002/0072381 to Becker et al, teaches transmission of time synchronization signals from one base station to another in a mobile telephone communication system. Becker '381 seeks to do this to reduce the costs of having numerous GPS receivers in a mobile phone system. The synchronization signals are transmitted by wireless communications.

However, I have not seen the transmission of time and date signals received from a GPS receiver to a large number of private base transceiver subsystems in a public/private mobile communications system. Further, I have not seen the transmission of GPS time and date information over a LAN cable to a large number of private base transceiver subsystems. Further, I have not seen the transmission of GPS time and date signals to recipient private base transceiver subsystems to generate a plurality of internal clocks in these private base transceiver subsystems where the private base transceiver subsystems do not have a GPS receiver or a GPS antenna.

SUMMARY OF THE INVENTION

It is therefore an object of the present invention to provide a signal supply apparatus for a public and private mobile communication system that enables a base station controller to receive GPS information and to supply a reference clock and TOD information to the base station controller and base transceiver subsystems.

It is also an object of the present invention to provide a signal supply apparatus that enables a base station controller to supply a reference clock and TOD information to the base station controller and base transceiver subsystems using the existing lines.

It is further an object of the present invention to distribute to a large number of private base transceiver subsystems GPS time and date information over a LAN cable.

It is still yet another object of the present invention to generate internal clocks in a large number of private base transceiver subsystems using GPS information sent over a cable.

It is yet also another object of the present invention to generate internal clocks in a large number of private base transceiver subsystems from GPS time and date signals where the private base transceiver subsystems do not have either a GPS receiver or a GPS antenna.

In order to accomplish these objects, there is provided a signal supply apparatus for a public and private mobile communication system including a plurality of Internet protocol base transceiver subsystems each having a plurality of Internet protocol private base transceiver subsystems which can be connected by an Internet protocol, respectively; and a private base station controller that controls the plurality of Internet protocol base transceiver subsystems and checks their status, the private base station controller receiving a reference clock and time of day (TOD) information from a satellite, and transmitting to the plurality of Internet protocol base transceiver subsystems various kinds of signals including the TOD information and a sync clock having a frequency that can be transmitted through a local area network (LAN) cable; wherein each of the Internet protocol base transceiver subsystems comprises the plurality of Internet protocol private base transceiver subsystems that can be connected by the Internet protocol through the LAN cable, and generate various kinds of clocks internally required using the sync clock; and collective base transceiver subsystems, connected to the plurality of Internet protocol private base transceiver subsystems through the LAN cable, for performing a function of the base station controller with respect to the plurality of Internet protocol base transceiver subsystems and performing a function of one base transceiver subsystem with respect to the private base station controller, the collective base transceiver subsystems performing a conversion and inverse conversion of a call service signal from the private base station controller into the Internet protocol, and transmitting various kinds of signals including the sync signal and the TOD information transmitted by the private base station controller and the call service signal converted into the Internet protocol to the plurality of Internet protocol base transceiver subsystems through the LAN cable.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
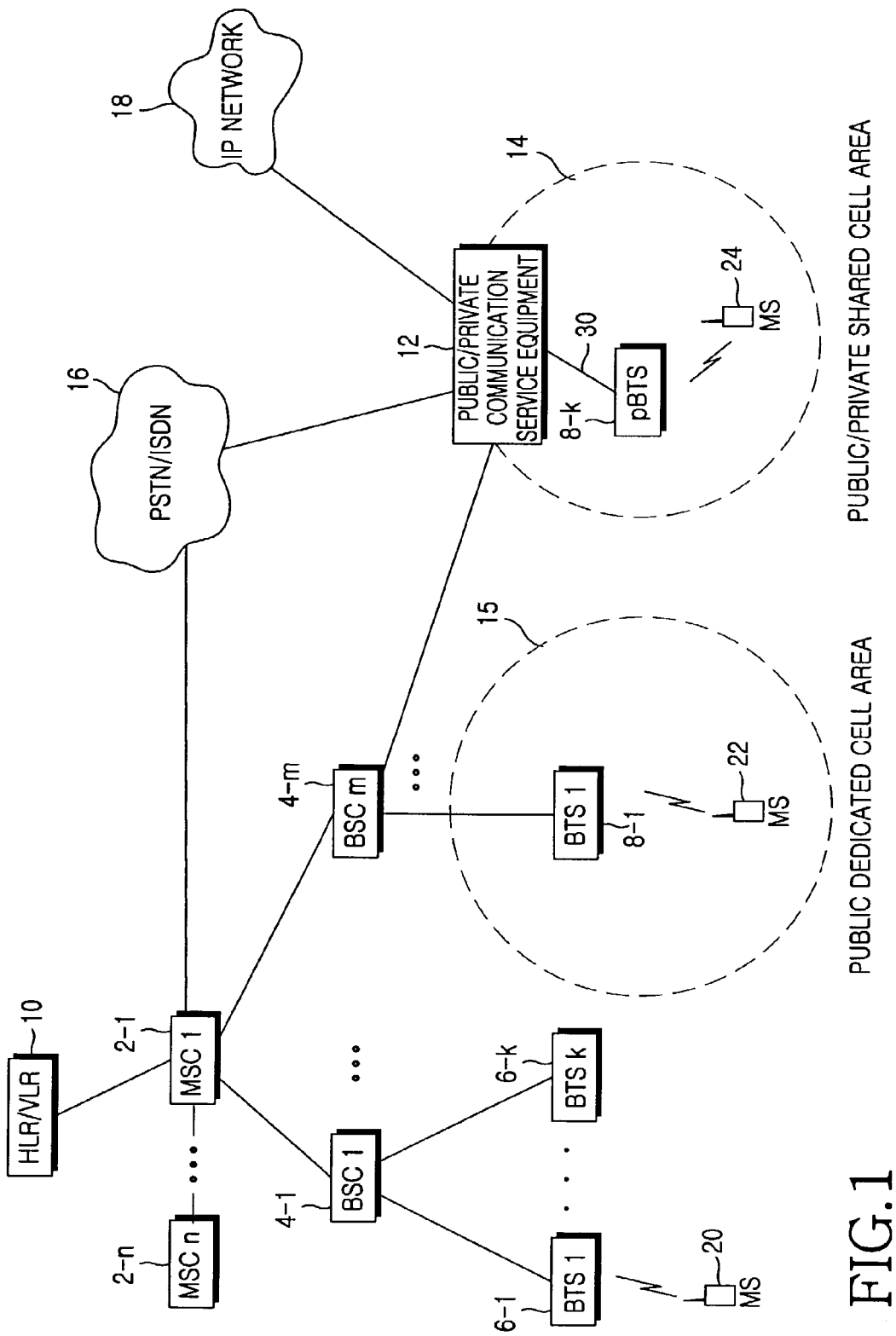
FIG. 1 is a block diagram of a network for explaining the concept of a public and private mobile communication service.

The mobile communication network is classified into a public mobile communication network and a private (or intra-office) mobile communication network, and if the mobile communication service is provided with the interlocking of the two networks, it will be much convenient to users. This is called a public and private mobile communication system. FIG. 1 shows the construction of a public and private mobile communication system that can provide both a public mobile communication service and a private mobile communication service. In order to provide both the public and private mobile communication services, the public and private mobile communication system, as shown in FIG. 1, has a public/private shared cell area 14 that is a public and private shared communication service area, and is provided with a public/private communication service equipment 12. It is preferable that the public/private shared cell area 14 is allocated for the convenience of a specified group (company, institution, school, etc.) in providing a communication service. For instance, if it is assumed that a specified company uses a building, an area to which the building belongs may be allocated as the public/private shared cell area 14. It is preferable that allocation of the public/private shared cell area 14 is made in agreement with a public mobile communication service provider in advance. In this case, a private base transceiver subsystem (private BTS: 8-$k$) in the public/private shared cell area 14 can be recognized as a public BTS from a viewpoint of the public mobile communication system. In the description, in order to discriminate the BTSs belonging to the public mobile communication system, i.e., the BTSs 6-1 to 6-$k$, and 8-1 illustrated in FIG. 1, from the private BTS 8-$k$ in the public/private shared cell area 14, the private BTS 8-$k$ is called "pBTS". The pBTS 8-$k$ is in radio communication with a mobile station (MS) 24 located in the public/private shared cell area 14, and performs a function of managing radio resources. The pBTS 8-$k$ is connected to a base station controller (BSC) of the public mobile communication system, for instance, BSC 4-$m$ illustrated in FIG. 1, through the public/private communication service equipment 12. The public/private communication service equipment 12 is connected to the BSC 4-$m$ of the public mobile communication system, a public switch telephone network/integrated services digital network (PSTN/ISDN) 16, and an Internet protocol network 18. The public/private communication service equipment 12 performs the mobile communication service so that the public mobile communication service and the private mobile communication service can be selectively provided to mobile stations (MSs) in the public/private communication shared cell area 14, for example, an MS 24 of FIG. 1. If the MS 24 is registered in the public/private communication service equipment 12 so that it can receive the private mobile communication service, the MS 24 can receive the private mobile communication service in addition to the public mobile communication service. However, if the private mobile communication service of the MS is not registered in the public/private communication service equipment 12, the MS 24 can receive only the public mobile communication service. Also, the public/private communication service equipment 12 performs a wire communication service with the PSTN/ISDN 16 and the IP network 18.

Meanwhile, the public mobile communication network is typically called a public land mobile network (PLMN), and includes, as illustrated in FIG. 1, a plurality of mobile switching centers (MSCs) 2-1 to 2-$n$, a plurality of base station controllers (BSCS) 4-1 to 4-$m$, a plurality of base transceiver subsystems (BTSs) 6-1 to 6-$k$, and 8-1 to 8-$k$, mobile stations (MSs) 20 and 22, and a home location register/visitor location register (HLR/VLR) 10. The plurality of MSCs 2-1 to 2-$n$ are connected to the plurality of BSCs 4-1 to 4-$m$, respectively, and the plurality of BSCs 4-1 to 4-$m$ are connected to the plurality of BTSs 6-1 to 6-$k$, and 8-1 to 8-$k$, respectively. Especially, the pBTS 8-$k$ among the plurality of BTSs 8-1 to 8-$k$ is connected to the BSC 4-$m$ of the public mobile communication system. The respective MSCs 2-1 to 2-$n$ controls the connection of the respective BSCs 4-1 to 4-$m$ to the PSTN/ISDN or another MSC in the public mobile communication network. The respective BSCs 4-1 to 4-$m$ perform a wireless link control and a handoff function, and the respective BTSs 6-1 to 6-$k$, and 8-1 to 8-$k$ constitute wireless communication paths along with the MS 20, 22, and 24 which belong to their own communication service areas, i.e., which belong to their cell areas, and manage the wireless resources. In the HLR/VLR 10, the HLR performs a function of registering subscriber locations and a database function of storing subscriber information, and the VLR is a database for temporarily storing information of the MS existing in the cell area of the corresponding MSC among the plurality of MSCs 2-1 to 2-$n$. If the MS moves to a cell area that is managed by another MSC, the information stored in the corresponding VLR is deleted. In the description, in order to discriminate from the public/private shared cell area 14, the communication service areas of the BTSs 6-1 to 6-$k$, and 8-1 to 8-$k$ of the public mobile communication system are called public dedicated cell areas. As an example, the communication service area of the BTS 8-1 among the BTSs 6-1 to 6-$k$, and 8-1 to 8-$k$ of the public mobile communication system is marked as the public dedicated cell area 15 in FIG. 1. Typically, the public dedicated cell area 15 is much wider than the public/private shared cell area 14 determined for the convenience of a specified group in providing a communication service.

In FIG. 1, an E1 line 30 connects the public/private communication service equipment 12 to the pBTS 8-$k$, and thus whenever a new pBTS is added, a new E1 line should be installed. This causes an increase of the installation cost and inconvenience in system installation.

In the embodiment of the present invention, considering that the place where the private mobile communication service is to be used is a building of a specified group and the typical LAN cables have already been installed in the building, the existing LAN cables are used instead of new E1 lines.

Figure 2:
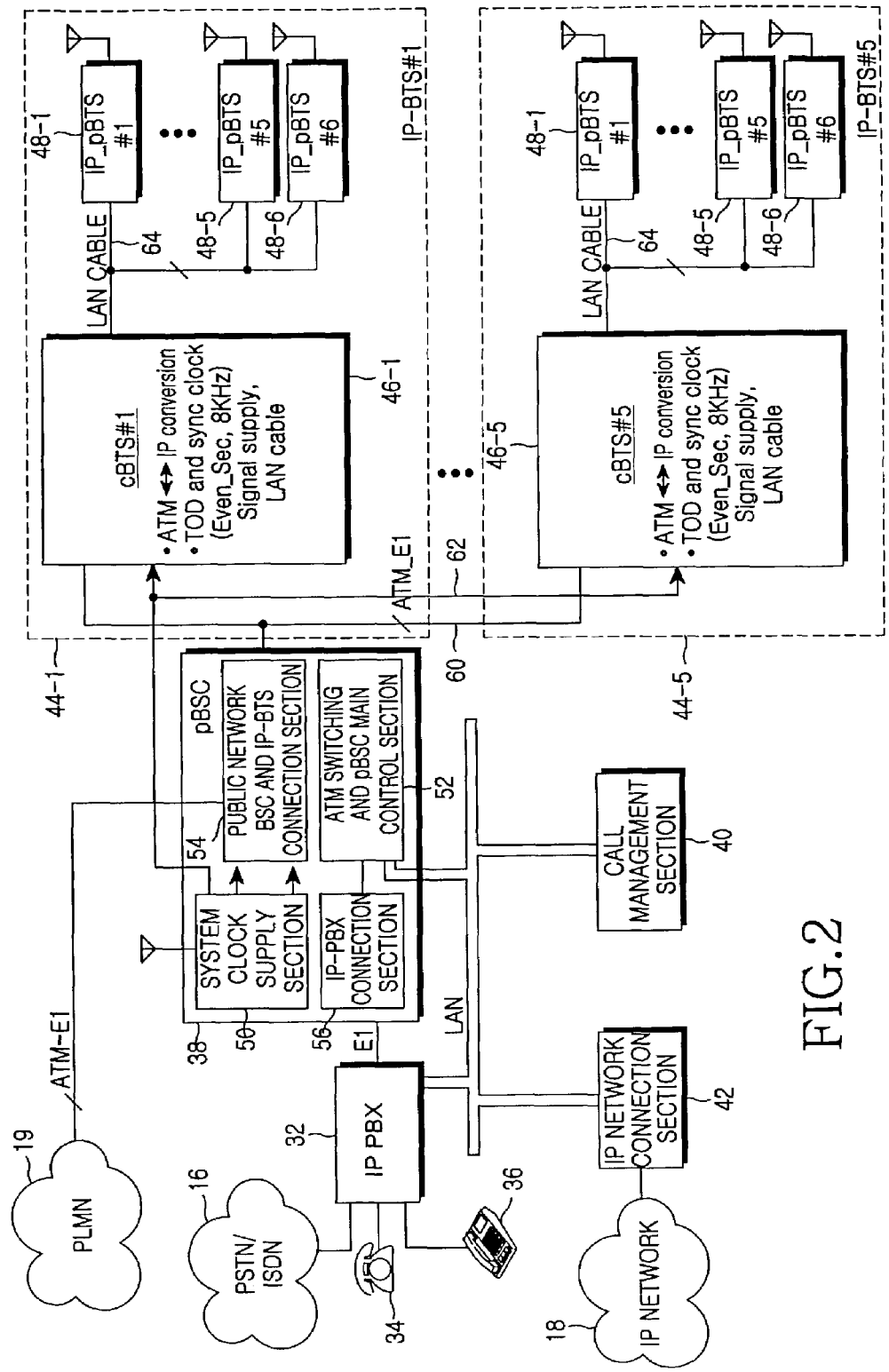
FIG. 2 is a block diagram of the public and private communication service equipment according to an embodiment of the present invention.

FIG. 2 is a block diagram of the public and private communication service equipment according to an embodiment of the present invention. In FIG. 2, collective base transceiver subsystems (cBTSs) 46-1 to 46-5 in Internet protocol base transceiver subsystems (IP-BTSs) 44-1 to 44-5 are connected to corresponding Internet protocol private base transceiver subsystems (IP-pBTSs) 48-1 to 48-6, respectively, through LAN cables 64.

Referring to FIG. 2, an Internet protocol private branched exchange (IP-PBX) 32 is a private exchange having a voice over Internet protocol (VoIP) function. The IP-PBX 32 accommodates intra-office wire subscribers 34 by connecting to a PSTN/ISDN 16, and can connect to an intra-office dedicated digital telephone 36. Also, the IP-PBX 32 has a VoIP card mounted therein, and supports the VoIP function. In case of connecting to a private base station controller (pBSC) 38, the IP-PBX is also used as a switching system. That is, the IP-PBX 32 switches a private mobile communication service (i.e., intra-office call), which is not the public network connection, under the control of the pBSC 38. The IP-PBX 32 is connected to the pBSC 38 by the E1 line, and has a LAN port for the VoIP support.

The pBSC 38 is abase station controller that controls the lower IP-BTSs 44-1 to 44-5 and checks their status. If the public mobile communication service is requested from the MS located in the public/private shared cell area 14, the pBSC 38 serves to directly bypass the request to the public BSC 4-m of FIG. 1 without passing through the IP-PBX 32. The pBSC 38 is divided into 4 parts: a system clock supply section 50, an asynchronous transfer mode (ATM) switching and pBSC main control section 52, a public network BSC and IP-BTS connection section 54, and an IP-PBX connection section 56.

The system clock supply section 50 includes a GPSR and a master clock distribution board assembly (MCDA). The system clock supply section 50 receives GPS information including a reference clock and TOD information from a satellite, and supplies various kinds of signals required for respective blocks and sync clocks to the blocks. In the embodiment of the present invention, signals transmitted from the system clock supply section 50 to the IP-BTSs 44-1 to 44-5 include the TOD information and the power supply voltage, and the sync clocks includes sync clocks having a frequency of 8 KHz, which can be transmitted through the LAN cable 64, and an even second signal Even_Sec.

The ATM switching and pBSC main control section 52 includes an ATM switch, an alarm signal collection section, and a main control section. The ATM switch performs an ATM switching function, and the alarm signal collection section collects alarm signals applied by the respective blocks. The main control section performs the whole control of the respective blocks of the pBSC 38, and is connected to the call management section 40 by an optical cable to inform the alarm signals collected by the alarm signal collection section to the call management section 40. The public BSC and IP-BTS connection section 54 is a block for connecting to a public network PLMN (i.e., BSC 4-m in the embodiment of FIG. 1). The IP-PBX connection section 56 converts an audio compressed signal received from the MS into a pulse code modulation (PCM) signal, and transfers the PCM signal through the E1 lines. The respective blocks of the pBSC 38 communicate with one another through a multiplexer and demultiplexer for multiplexing and demultiplexing the ATM cells. The multiplexer and demultiplexer multiplexes the ATM cells coming out of respective sources, and transfers the multiplexed ATM cells to a destination. The multiplexer and demultiplexer also performs a demultiplexing operation opposite to the above multiplexing operation.

An IP network connection section 42 is a block for connecting to an IP network 18, and is composed of a hub and a router. The call management section 40 is the pBSC management equipment that provides to the users operation status of the pBSC 38 and the IP-BTSs 44-1 to 44-5 and various kinds of alarms generated during operation in a graphic user interface (GUI) environment. Also, the call management section 40 downloads a program required by the respective blocks during the system operation through the pBSC main control section in the pBSC 38, and automatically updates the program when it is changed. The call management section 40 also performs a remote control of the pBSC 38 and the IP-BTSs 44-1 to 44-5 so that the environment or operation of the pBSC 38 or the IP-BTSs 44-1 to 44-5 can be changed during the system operation.

The IP-BTSs 44-1 to 44-5 are parts that allocate the wireless resources, and interface with the MS located in the public/private shared cell area (i.e., 14 in FIG. 1) by sending an actual radio frequency (RF) signal. Also, the respective IP-BTSs 44-1 to 44-5 receives audio data from a public network BSC and IP-BTS connection section 54 of the pBSC 38, converts the audio data into an RF signal, and then transmits the RF signal through an antenna. In the opposite operation, the respective IP-BTSs also receives an RF signal from the MS, converts the RF signal into a digital compressed signal, and then sends the digital compressed signal to the pBSC 38. Specifically, each of the respective IP-BTSs 44-1 to 44-5 is composed of one cBTS and 6 IP-pBTSs at maximum, and from the viewpoint of the pBSC 38, they are managed and operated as one BTS.

The IP-BTS 44-1 among the IP-BTSs 44-1 to 44-5 is composed of one cBTS 46-1 and 6 IP-pBTSs 48-1 to 48-6. The pBSC 38 and the cBTS 46-1 are connected through an ATM-E1 line 62 in the same manner as the connection between the existing BSC and the BTS, but the connection among the 6 IP-pBTSs 48-1 to 48-6 corresponding to the cBTS 46-1 is made through a LAN cable 64. As the cBTS 46-1 and the 6 IP-pBTSs 48-1 to 48-6 are connected through the LAN cable 64, transmission control protocol (TCP) and user datagram protocol (UDP) communications can be performed between the cBTS 46-1 and the 6 IP-BTSs 48-1 to 48-6. Since the LAN cable 64 is typically installed wherever the public and private mobile communication service is received, a plurality of IP-pBTSs can be installed using the LAN cable 64 with the installation cost of the system reduced. Also, the additional installation of the IP-pBTSs can be conveniently performed.

The cBTS 46-1 in the IP-BTS 44-1 that is one among the blocks constructed to accommodate the plurality of IP-BTSs and the LAN cable 64 is located between the IP-pBTSs 48-1 to 48-6 and the pBSC 38. The cBTS 46-1 performs a function of a base station controller with respect to the IP-pBTSs 48-1 to 48-6, and performs a function of a base transceiver subsystem with respect to the pBSC 38. That is, the cBTS 46-1 performs various kinds of functions for enabling the 6 IP-pBTSs 48-1 to 48-6 at maximum provided in the IP-BTS 44-1 to be regarded as one BTS from the viewpoint of the pBSC 38. The various kinds of functions of the cBTS 46-1 will be explained in detail below.

wireless resources management, call control, statistics, status, alarm, etc.

status management of the IP-pBTSs 48-1 to 48-6 and information providing to the pBSC 38

IP-to-ATM mapping function

ATM/inter-processor communication (IPC) control function (ATM adaptation later (AAL) 0/2/5)

real-time transport protocol (RTP) control function with the IP-pBTSs handoff control function among the lower corresponding IP-pBTSs 48-1 to 48-6 connected to the cBTS 46-1 itself (at this time, ATM path information is not changed.)

base station controller identifier (ID) control function for handoff with other IP-pBTSs (including cBTS). Different base transceiver subsystem IDs are given to the respective IP-pBTSs 48-1 to 48-6, but the cBTS 46-1 is controlled by the base transceiver subsystem ID which is known to the network.

The respective IP-pBTSs 48-1 to 48-6 connected to the cBTS 46-1 through the LAN cable 64 perform the following function. Each of the IP-pBTSs 48-1 to 48-6 is composed of a wireless channel control section, a modem section, a radio frequency/intermediate frequency (RF/IF) section, an IP connection section, an antenna section (distributed antenna), etc., and accommodates 32 channels for an audio subscriber and 4 channels for a data subscriber (based on 144 kbps). Also, the channel control section performs an IP connection for a bi-directional accommodation and a status control of the IP-pBTS in consideration of a channel management performance. The antenna section is composed of 1-8 distributed antennas to accommodate an attenuation of 0-9 dbm. The respective IP-pBTSs 48-1 to 48-6 perform the RTP control function with the cBTS 46-1.

Though the IP-BTS 44-1 and its internal blocks have been explained as above, it should be understood that the remaining IP-BTSs 44-2 to 44-5 and their internal blocks perform the same operation as the IP-BTS 44-1 and its internal blocks.

Figure 3:
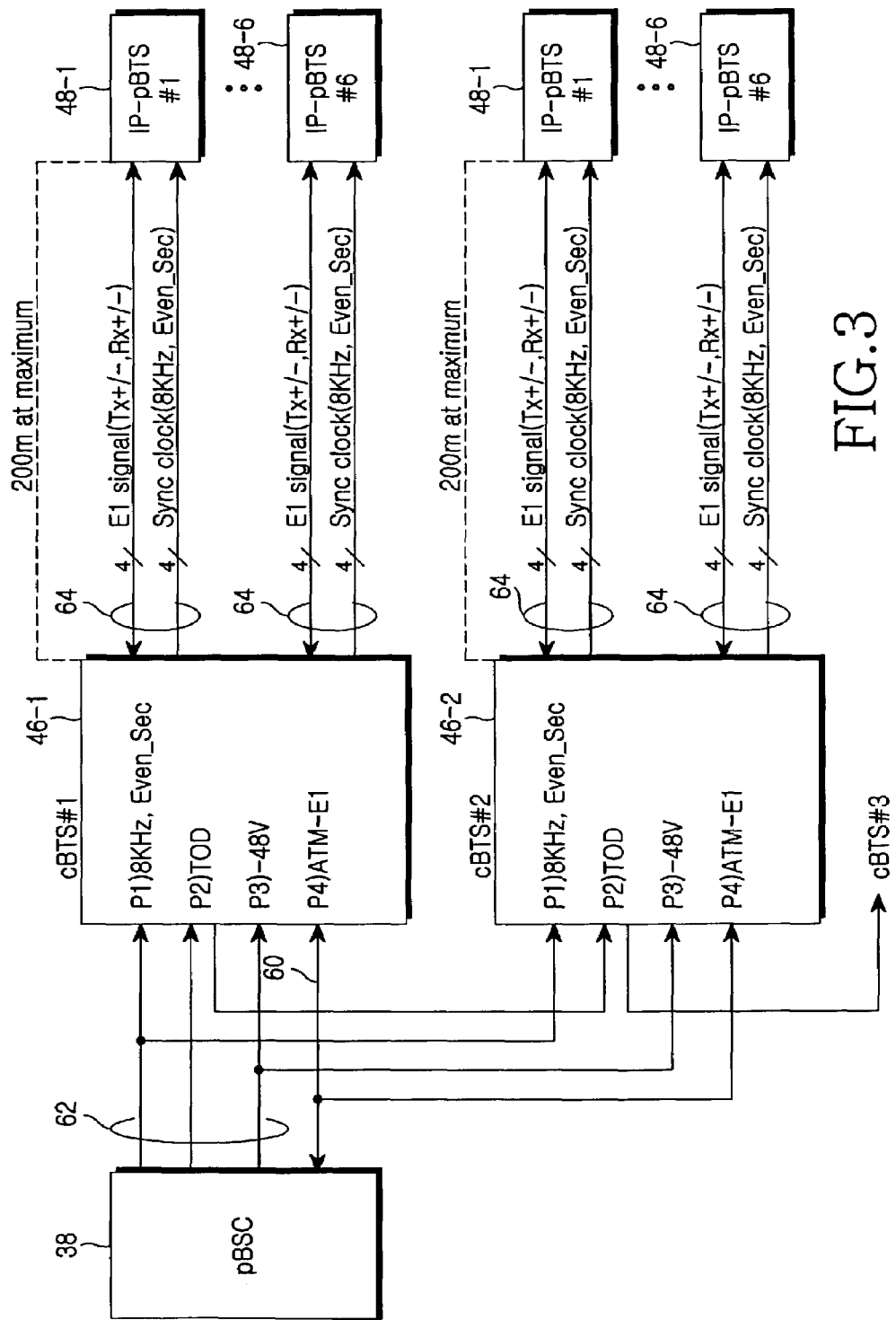
FIG. 3 is a view illustrating a connection state of signal lines for supplying signals from a pBSC to IP-pBTSs.

FIG. 3 is a view illustrating a connection state of signal lines for supplying signals from the pBSC 38 to the IP-pBTSs 48-1 to 48-6 corresponding to the cBTSs 46-1 to 46-5. FIG. 3 shows two cBTSs 46-1 and 46-2 among 5 cBTSs 46-1 to 46-5 and 6 IP-pBTSs 48-1 to 48-6 corresponding to the cBTSs 46-1 and 46-2.

Figure 5:
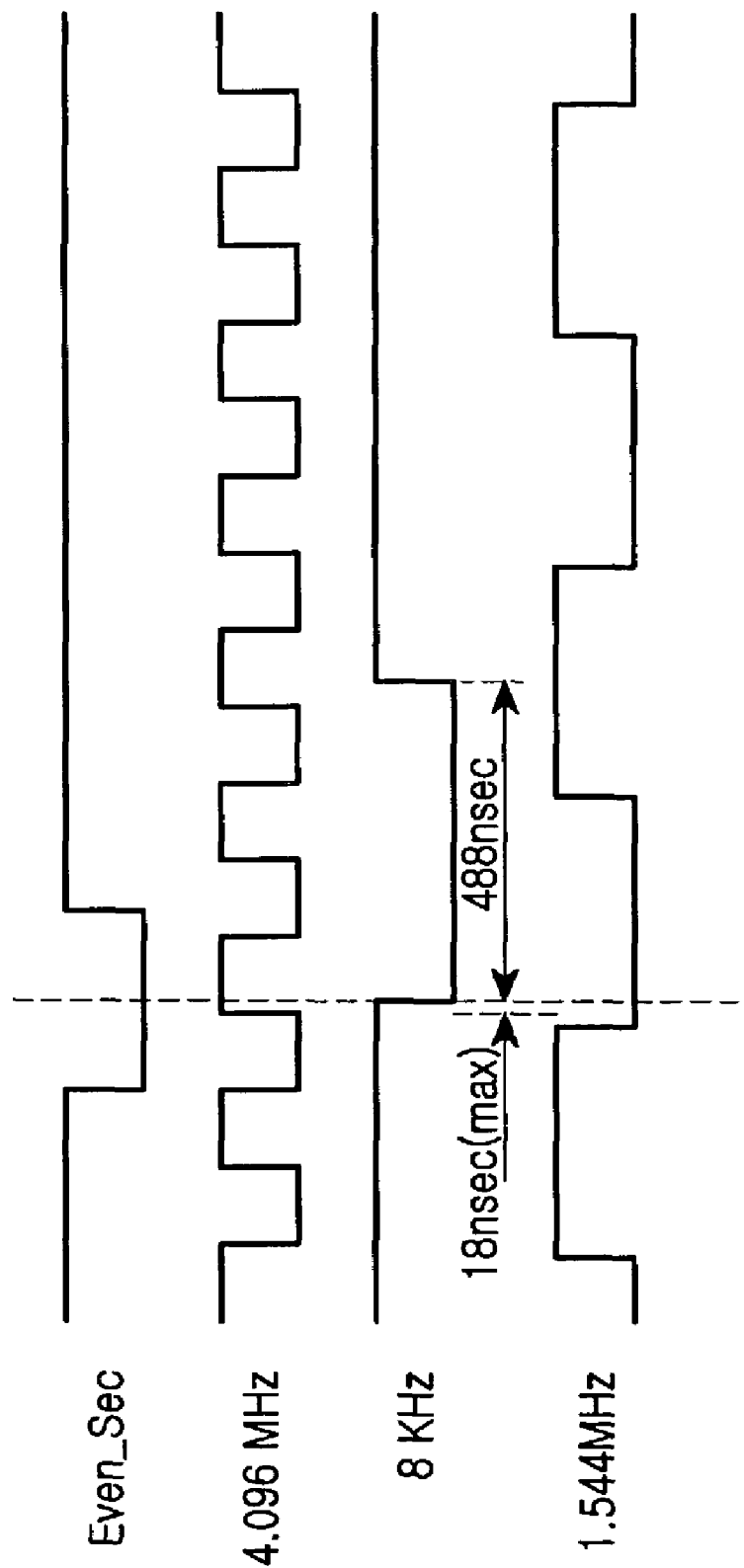
FIG. 5 is a timing diagram of sync clock signals.

It is preferable that the pBSC 38 and the cBTSs 46-1 to 46-5 are mounted together on a shelf. Various kinds of signals and the sync clock provided from the system clock supply section 50 of the pBSC 38 are supplied to the cBTSs 46-1 to 46-5 through a clock supply cable 62. As shown in FIG. 3, the various kinds of signals and the sync clock are a sync clock of 8 KHz, an even second signal Even_Sec, a TOD signal, and a power supply voltage of –48V. The timing of the sync clock of 8 KHz and the even second signal Even_Sec is illustrated in FIG. 5. Referring to FIG. 5, the even second signal Even_Sec has a pulse width corresponding to one period of a 4.096 MHz signal, and the 8 KHz signal has a pulse width corresponding to two periods of the 4.096 MHz signal. However, the phase of a 1.544 MHz signal is not consistent with that of the even second signal Even_Sec.

Referring again to FIG. 3, the TOD signal among the various kinds of signals and the sync clock is applied to the cBTS 46-1, cBTS 46-2, and cBTSs 46-3 to 46-5 in order. Between the public BSC and IP-BTS connection section 54 of the pBSC 38 and the cBTSs 46-1 to 46-5 is connected an ATM-E1 line 60, and an ATM E1 signal is transmitted/received through the ATM-E1 line 60. Also, between the cBTSs 46-1 to 46-5 and the corresponding IP-pBTSs 48-1 to 48-6 is connected the LAN cable 64. The LAN cable 64 is composed of 4 lines of the E1 signal and 4 lines of the reference clock, and can be installed with a length as long as 200 meters at maximum.

The cBTSs 46-1 to 46-5 located between the pBSC 38 and the IP-pBTSs 48-1 to 48-6 are in an ATM-E1 connection with the pBSC 38, and in an IP connection with the IP-pBTSs 48-1 to 48-6 through an Ethernet port. That is, the respective cBTSs 46-1 to 46-5 receive the ATM-E1 signal from the pBSC 38, convert the ATM-E1 signal into an IP signal, and then transfer the IP signal to the IP-pBTSs 48-1 to 48-6. The respective cBTSs 46-1 to 46-5 supply the even second signal Even_Sec that is the sync clock required by the IP-pBTSs 48-1 to 48-6, the 8 KHz signal, and the TOD signal to the lower IP-pBTSs 48-1 to 48-6. The clock signals required by the IP-pBTSs 48-1 to 48-6 are, for example, a 10 MHz signal, 29.4912 MHz signal, 4.096 MHz signal, 1.544 MHz signal, even second signal Even_Sec, etc. However, since the high-frequency signals in the range of about several to several tens of MHz cannot be sent far (i.e., 200 m at maximum), only the even second signal Even_Sec that is the sync clock and the 8 KHz signal are supplied. In this case, the respective IP-pBTSs 48-1 to 48-6 provide the sync clock to their internal phase locked loop (PLL) logic as the reference signal, and the required clocks (for example, the 10 MHz, 29.4912 MHz, 4.096 MHz, and 1.544 MHz) synchronized by the PLL logic are generated.

One cBTS is designed to control 6 IP-pBTSs at maximum. Accordingly, if it is assumed that 5 cBTSs are mounted, each cBTS accommodates 6 IP-pBTSs at maximum, and thus 30 IP-pBTSs are connected from the viewpoint of one pBSC 38. If 30 IP-pBTSs 48-1 to 48-6 are directly connected to one pBSC 38, the corresponding number of E1 lines (i.e., 30 E1 lines) is required. Also, the capacity that can be processed by the pBSC 38 is limited. Thus, in the embodiment of the present invention, the cBTSs 46-1 to 46-5 are mounted between the pBSC 38 and the IP-pBTSs 48-1 to 48-6, so that the cBTSs process the signals which are not required to pass through the pBSC 38.

Figure 4:
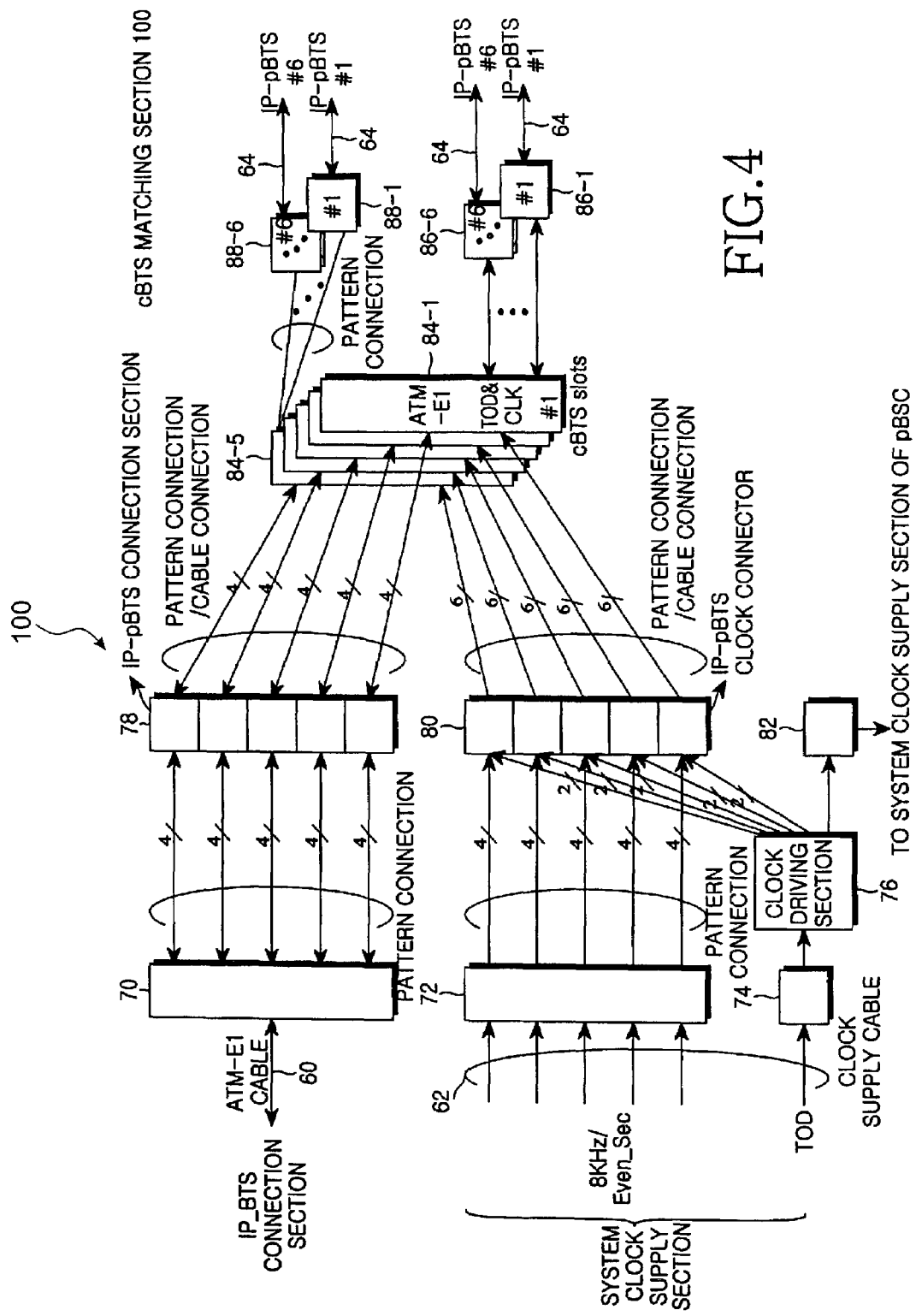
FIG. 4 is a block diagram of a cBTS matching section constructed for internal or external mounting of cBTSs in a system.

FIG. 4 is a block diagram of a cBTS matching section 100 constructed for the internal or external mounting of 5 cBTSs 46-1 to 46-5 in the system. The cBTS matching section 100 to be explained later is provided with connectors and slots installed therein in order to support all the internal and external mounting of the cBTSs 46-1 to 46-5 in the system.

Referring to FIG. 4, The ATM-E1 signal received from the pBSC 38 through the ATM-E1 cable is connected to a connector 70 illustrated in FIG. 4, and then connected to an IP-pBTS connector 78 through patterns. Between the IP-pBTS connector 78 and cBTS slots 84-1 to 84-5 for mounting the cBTSs 46-1 to 46-6 are connected backboard patterns (in case of built-in cBTS) or cables (in case of armored cBTS). The sync clock signal of 8 KHz and the even second signal Even_Sec received from the pBSC 38 through the clock supply cable 62 are connected to a connector 72 through the clock supply cable 62, and then connected to an IP-pBTS clock connector 80 through the patterns. Between the IP-pBTS clock connector 80 and cBTS slots 84-1 to 84-5 for mounting the cBTSs 46-1 to 46-5 are connected backboard patterns (in case of built-in cBTS) or cables (in case of armored cBTS). The TOD signal received from the pBSC 38 through the clock supply cable 62 is connected to a clock driving section 76 through a connector 74. The TOD signal is driven by the clock driving section 76, and connected to the IP-pBTS clock connector 80. The TOD signal transmitted from the system clock supply section of the pBSC 38 is received only through a pre-provided port, and since it is required for the cBTS to receive the TOD signal through 5 ports, the clock-driving section 76 is provided. The clock driving section 76 provides the TOD signal to the IP-pBTS clock connector 80 and to the system clock supply section 50 of the pBSC 38 through a connector 82 by allocating one port.

The signal lines connected to the CBTS slots 84-1 to 84-5 through the backboard patterns (in case of built-in cBTS) and the cables (in case of armored cBTS), as shown in FIG. 4, are 4 ATM-E1 signal lines ATM-E1, and 6 clock signal lines 8 KHz+/−, Even_Sec +/−, and TOD TX+/TOD TX−. The respective cBTS slots 84-1 to 84-5 are connected through patterns to 6 connectors 86-1 to 86-6 and 88-1 to 88-6 provided for the connection to the 6 IP-pBTSs 48-1 to 48-6.

The transfer of the E1 signal and the sync clock from one cBTS to 6 IP-pBTS 48-1 to 48-6 using the LAN cable 64 according to the embodiment of the present invention has the following advantages.

Typically, the clock signals required by the BTS are generated using the GPSR mounted in the BTS. That is, the GPSR mounted in the BTS receives the reference clock from the satellite, and generates clocks required by the respective blocks through the internal PLL logic based on the reference clock. In the embodiment of the present invention, since it is not easy in cost, installation, maintenance and repair to mount the GPSR for each IP-pBTS in a structure that can accommodate 30 IP-pBTSs at maximum, an 8-wire LAN cable is used. The existing LAN cable can be used as they are, or a new LAN cable may be installed. The newly installed LAN cable is used not only for the transmission of the E1 signal, sync clock, and TOD information according to the embodiment of the present invention, but also for the data transmission in a network terminal using an Ethernet port. In the embodiment of the present invention, among the 8 wires of the LAN cable, 4 lines are used for the transmission of the E1 signal Tx+/Tx− and Rx+/Rx−, and the remaining 4 lines are used for the transmission of the sync clock of 8 KHz and the even second signal Even_Sec. Since the 8 KHz signal and the even second signal Even_Sec (0.5 Hz) are low-frequency signals of several to several tens of Hz, the loss due to the length of line is small. Accordingly, the IP-pBTS that received the 8 KHz signal and the even second signal Even_Sec (0.5 Hz) through the LAN cable can reproduce the required clocks through the PLL logic based on the 8 KHz signal and the even second signal Even_Sec. Also, the TOD signal received from the satellite by the system clock supply section 50 is provided to the respective IP-BTS under the control of the pBSC main control section of the ATM switching and pBSC main control section 52 in the pBSC 38. Since the IP-pBTSs 48-1 to 48-6 according to the embodiment of the present invention do not mount the GPSR therein, the TOD signal is directly transmitted from the system clock supply section 50 to the respective IP-pBTSs 48-1 to 48-6. The TOD signal is a message having a specified format, and thus can be outputted from the system clock supply section 50 to the respective IP-BTSs through the cBTS.

In the embodiment of the present invention, an unshielded twisted pair (UTP) cable represented as a high-speed and extremely high-speed information communication cable is used as the LAN cable 64 provided between the cBTSs 46-1 to 46-5 and the IP-pBTSs 48-1 to 48-6, respectively.

As described above, according to the present invention, the GPSR is not mounted in the BSC and the pBTS, respectively, and thus the system cost can be reduced. Also, the required signals and the sync signal are supplied to the pBTS through only one line of the LAN cable, and thus the cost for system installation can be reduced with the convenience in construction greatly increased. Also, the present invention can support both the internal mount and the external mount of the cBTS in the system to provide convenience to users.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus, comprising:
   a plurality of Internet protocol base transceiver subsystems; and
   a private base station controller connected to each of the plurality of Internet protocol base transceiver subsystems, the private base station controller comprising a system clock supply section having a single global positioning satellite (GPS) receiver receiving reference clock information and time of day (TOD) information from a satellite, each of said plurality of Internet protocol base transceiver subsystems comprising:
   a plurality of Internet protocol private base transceiver subsystems;
   collective base transceiver subsystem; and
   a LAN cable connecting the plurality of Internet protocol private base transceiver subsystems to the respective collective base transceiver subsystem, the collective base transceiver subsystem relaying said reference clock information and said TOD information from said private base station controller to the plurality of Internet protocol private base transceiver subsystems.

2. The apparatus of claim 1, the clock reference information having a signal frequency that can be sent through the LAN cable, said signal frequency being in the range of several to several tens of MHz.

3. The apparatus of claim 2, the clock reference information comprises a 8 KHz signal and an even second signal which is disposed in said private base station controller.

4. The apparatus of claim 1, said apparatus comprising only a single GPS receiver.

5. The apparatus of claim 1, each plurality of Internet protocol private base transceiver subsystems being managed and operated by said private base station controller as a single base transceiver subsystem.

6. The apparatus of claim 1, each Internet protocol private base transceiver subsystem providing both public and private wireless communication to a plurality of mobile stations.

7. The apparatus of claim 5, each Internet protocol private base transceiver subsystem providing both public and private wireless communication to a plurality of mobile stations.

8. A method, comprising the steps of:
   receiving reference clock information and time of day (TOD) information from a satellite by a receiver in a private base station controller;
   relaying said reference clock information and said TOD information to a plurality of collective base transceiver subsystems connected to said private base station controller; and
   relaying said reference clock information and said TOD information from each of said plurality of collective base transceiver subsystems to respective pluralities of Internet protocol private base transceiver subsystems, each plurality of Internet protocol private base transceiver subsystems being connected to one of said plurality of collective base transceiver subsystems by a LAN cable, said private base station controller being connected to an internet protocol private branch exchange (IP-PBX) and a public land mobile network (PLMN) supplying public and private mobile communication services to each of said plurality of Internet protocol private base transceiver subsystems and any mobile stations that utilize any one of said plurality of Internet protocol private base transceiver subsystems.

9. The method of claim 8, further comprising the step of generating an internal clock in each Internet protocol private base transceiver subsystem upon receipt of said clock information and said TOD information via said LAN cable.

10. The method of claim 9, each Internet protocol private base transceiver subsystem being absent a wireless receiver that receives said clock information and said TOD information from the satellite.

11. The method of claim 8, each Internet protocol private base transceiver subsystem providing both public and private wireless communication to a plurality of mobile stations.

12. An apparatus, comprising:
a private base station controller comprising a receiver receiving reference clock information and time of day (TOD) information from a satellite;
a first plurality of collective base transceiver subsystems connected to said private base station controller, each of said first plurality of collective base transceiver subsystems being configured to receive said reference clock information and said time of day (TOD) information from said private base station controller; and
a first plurality of a second plurality of Internet protocol private base transceiver subsystems, each second plurality of Internet protocol private base transceiver subsystems connected to corresponding ones of said first plurality of collective base transceiver subsystems, each Internet protocol private base transceiver subsystem being configured to receive said reference clock information and said time of day (TOD) information from a corresponding one of said first plurality of collective base transceiver subsystems, the private base station controller being connected to an internet protocol private branch exchange (IP-PBX) and a public land mobile network (PLMN) supplying public and private mobile communication services to each of said first plurality of a second plurality of Internet protocol private base transceiver subsystems and any mobile station that utilizes any one of said first plurality of said second plurality of Internet protocol private base station transceiver subsystems.

13. The apparatus of claim 12, each Internet protocol private base transceiver subsystem being connected to a corresponding one of said first plurality of collective base transceiver subsystems via a LAN cable.

14. The apparatus of claim 12, each Internet protocol private base transceiver subsystem having an internal clock that is synchronized with all other internal clocks in all other Internet protocol private base transceiver subsystems in said apparatus.

15. The apparatus of claim 12, each Internet protocol private base transceiver subsystem having an internal clock that is based on said reference clock information and said time of day (TOD) information received from said private base station controller via a corresponding one of said first plurality of collective base transceiver subsystems.

16. The apparatus of claim 13, each Internet protocol private base transceiver subsystem having an internal clock that is based on said reference clock information and said time of day (TOD) information received from said private base station controller via a corresponding one of said first plurality of collective base transceiver subsystems via a corresponding LAN cable.

17. The apparatus of claim 12, each Internet protocol private base transceiver subsystem providing both public and private wireless communication to a plurality of mobile stations.

18. The apparatus of claim 17, each Internet protocol private base transceiver subsystem having an internal clock that is synchronized with all other internal clocks in all other Internet protocol private base transceiver subsystems in said apparatus.

19. The apparatus of claim 17, each Internet protocol private base transceiver subsystem having an internal clock that is based on said reference clock information and said time of day (TOD) information received from said private base station controller via a corresponding one of said first plurality of collective base transceiver subsystems.

20. The apparatus of claim 17, each Internet protocol private base transceiver subsystem being connected to a corresponding one of said first plurality of collective base transceiver subsystems via a LAN cable.

21. The apparatus of claim 20, each Internet protocol private base transceiver subsystem having an internal clock that is based on said reference clock information and said time of day (TOD) information received from said private base station controller via a corresponding one of said first plurality of collective base transceiver subsystems via a corresponding LAN cable.

* * * * *